Patented Nov. 28, 1939

2,181,739

UNITED STATES PATENT OFFICE 2,181,739

RESINOUS BODY AND METHOD OF PRODUCING SAME

Winton I. Patnode, Schenectady, N. Y., assignor to General Electric Company, a corporation of New York No Drawing. Application September 24, 1937, Serial No. 165,507

2 Claims. (Cl. 260—80)

The present invention relates to resinous bodies resulting from the polymerization of unsaturated chemical compounds. More particularly, the invention relates to an improved method of producing masses of resinous material free from internal voids or bubbles.

It is known that certain unsaturated chemical compounds contain reactive double bonds by virtue of which the compounds may be polymerized to resinous bodies. Examples of such chemical compounds are derivatives of acrylic acid and substituted acrylic acid, styrene and vinyl esters. Certain of these compounds, notably styrene and methyl methacrylate are polymerized under the action of light, heat or chemical catalysts to form masses of transparent, hard, tough resinous character useful in industry and the arts.

In general, the procedure followed to produce useful resinous bodies, from methyl methacrylate for example, is to place the monomeric liquid (boiling point 100.3° C.) in a vessel with a certain amount of catalyst and heat it. Under these conditions the liquid becomes progressively more viscous and finally is transformed into a hard, tough, rigid resinous body. This change is generally conceded to be due to the polymerization of the monomer at the reactive double bond to produce chains of polymer of high molecular weight. This change is accompanied by an evolution of heat and a shrinkage of volume. These two phenomena require great care to be taken to control the process in such a fashion that the heat liberated is removed before the temperature of the material reaches the boiling point of the monomer and that the shrinkage takes place in such a fashion that the final solid material does not contain internal bubbles or voids. If by any chance the temperature of the polymerizing mass reaches the boiling point of the monomer especially when the mass is very viscous, bubbles of vapor are formed, which are trapped and appear in the product. Furthermore, it appears that bubbles may be formed even though the temperature of the mass is kept below the boiling point of the monomer owing to shrinkage of volume or precipitation of dissolved air. It also appears that particles of foreign material act as foci for shrinkage voids if the adhesion of the polymerizing mass to the foreign material is less than that of the polymer to itself. In any event, whatever is the tendency of the bubbles to form, the existence of the bubbles appears to be due chiefly to the physical condition of the polymerizing mass. Throughout the greater part of the polymerization, the mass is a viscous liquid easily distorted by small forces such as pressure within a bubble.

It is the object of the present invention to change the course of the polymerization in such a fashion that the polymerizing mass assumes a gel structure early in the process, which gel structure has sufficient rigidity to resist the formation of bubbles or voids. Shrinkage takes place throughout the whole mass under these conditions with much less tendency for the formation of shrinkage voids.

In order to obtain the object of my invention, I have found unexpectedly that the addition to the starting material of a relatively small proportion of compounds containing at least two reactive double bonds to the molecule, yields after polymerization, rigid, solid masses free from internal voids or bubbles.

I have found that it is necessary to add to the starting material only relatively minor proportions of the second polymerizable compound, for example a fraction of a per cent, to attain the object of my invention. As examples of such additional compounds I may mention allyl methacrylate, glycol dimethacrylate, diethylene glycol dimethacrylate, beta-allyloxy-ethyl methacrylate, allyl maleate, glycol maleate, and divinyl benzene. Although other examples of such polymerizable additive materials will be apparent to those skilled in the art to which this invention pertains, I give the following detailed examples in order to illustrate my invention of the production of readily polymerizable resinous masses without the formation of internal voids or bubbles:

1. 40 cc. of methyl methacrylate, 0.4 cc. of ethylene glycol dimethacrylate and 1.02 mg. benzoyl peroxide were placed in a test tube ¾ inch by 7 inches and heated to 100° C. for one minute. The test tube was then placed in a water bath at 70° C. Within two hours the mass was a gel and within 24 hours it was a hard, rigid, solid, free from internal voids or bubbles. A similar preparation but without the glycol dimethacrylate contained internal bubbles.

2. 40 cc. of ethyl methacrylate, 0.4 cc. of ethylene glycol dimethacrylate and 1.02 mg. of benzoyl peroxide were treated as in Example 1 with the same result.

3. 38 cc. of methyl methacrylate, 2 cc. of allyl methacrylate and 1.02 mg. of benzoyl peroxide were placed in a test tube ¾ inch by 7 inches and heated in an oven at 80° C. Within two hours the mass was a gel and within 24 hours it was a hard resin free from internal voids.

4. 90 parts styrene, 10 parts glycol dimethacrylate, 0.005 part benzoyl peroxide were placed in an oven at 50° C. Within sixteen hours the mass was a gel. A similar mixture without the glycol dimethacrylate was still liquid. After one week the sample containing the glycol dimethacrylate was a hard resin free from voids, while the sample without the glycol ester was a hard resin containing many bubbles.

It is to be noted that the chief feature of this invention is the formation of a gel early in the course of the polymerization. The subsequent treatment must be such as to produce the desired resin. The mere addition of compounds containing two or more reactive double bonds does not insure a perfect product; it must be accompanied by the proper treatment according to the kind and proportion of materials used and the geometry of the system. The advantage lies in the substitution of a gel for the viscous liquid which is easily distorted by small forces. The type and proportion of the polyreactive compound to be used depends upon the nature and main compound being polymerized. Less than 1% is effective in some cases while in others it may be desirable to use more, but in all cases only a relatively small proportion of the polyreactive compound is required and as illustrated in the foregoing examples from about 1% to about 10% of the polyreactive compound may be used.

The importance of producing a hard, rigid, resinous body free from internal voids or bubbles is obvious. In the production of electrical insulation for coils, for example, where the resinous material is cast around the coils or other irregular shaped conductors it is important to be able to polymerize the liquid resin around the conductors to a hard, dense mass free from internal voids or bubbles. The flexibility of the resinous mass may be controlled by the use of suitable plasticizers such as tricresyl phosphate, camphor, ethoxy-ethyl phthalate, triacetin and others. The addition of plasticizers lowers the cost of the resin and the liquid monomeric material will readily penetrate deep into coils or other materials ordinarily impregnated with varnishes.

What I claim as new and desire to secure by Letters Patent of the United States, is:

1. The method of producing a mass of resinous material free from internal voids or bubbles which comprises polymerizing styrene in the presence of 1% to 10% of allyl methacrylate.

2. A hard, rigid, solid resinous mass free from internal voids or bubbles comprising the product of copolymerization of styrene and 1% to 10% of allyl methacrylate.

WINTON I. PATNODE.